Feb. 11, 1958     W. A. BARNES     2,822,711
UTILITY PLIER TOOL
Filed Sept. 15, 1953
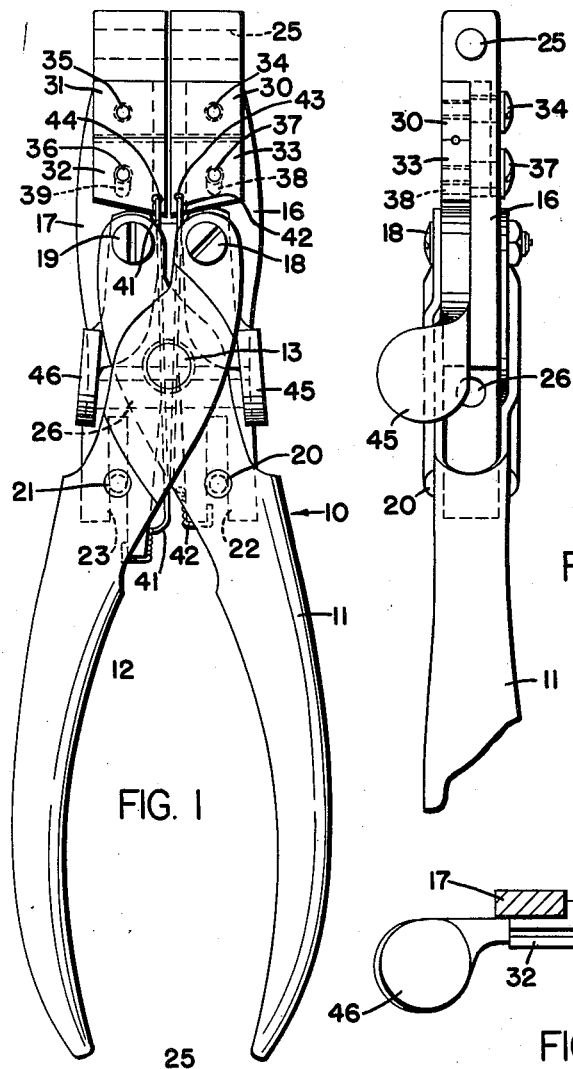
FIG. 1
FIG. 2
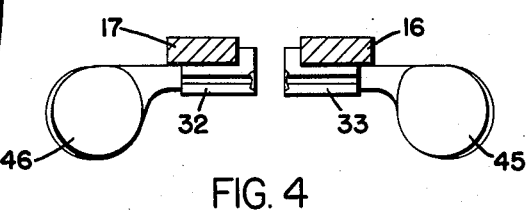
FIG. 4
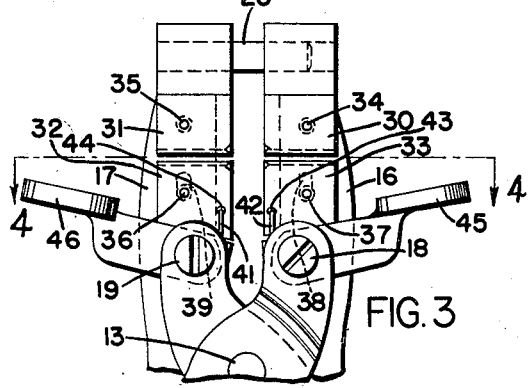
FIG. 3
*INVENTOR.*
WILLIAM A. BARNES
BY *Woodling and Krost*
ATTYS.

United States Patent Office 2,822,711
Patented Feb. 11, 1958

2,822,711
UTILITY PLIER TOOL

William A. Barnes, Utica, N. Y., assignor to Utica Drop Forge & Tool Corporation, a corporation of New York Application September 15, 1953, Serial No. 380,323

2 Claims. (Cl. 78—82)

This invention relates to work gripping and forming tools in general and relates more specifically to a utility tool having rectilinearly moving carriage jaws and having clamp jaws movable transversely to the path of movement thereof.

An object of this invention is to provide a tool having workpiece gripping jaws, which jaws are bodily movable as a unit to carry the gripped workpiece through a work cycle.

Another object of this invention is to provide a utility tool having workpiece holding jaws that close in a direction transverse to the line of bodily movement thereof.

And another object of this invention is to provide a tool having carriage jaws movable in a predetermined path toward and away from one another and carrying changeable workpiece holding and gripping jaws therealong.

Other objects and a fuller understanding of the invention may be had by referring to the following description and claims, taken in conjunction with the accompanying drawing, in which:

Figure 1 is a plan view of a manually operated adaptation of this invention;

Figure 2 is a side view of the manually operated adaptation of this invention;

Figure 3 is a partial view of the jaw area of the device with the jaws thereof opened to receive a workpiece; and Figure 4 is a sectional view taken along line 4—4 of Figure 3.

The tool 10 illustrated in the drawings has been found to be useful for several different applications such as the butt uniting of two wires by a solid phase diffusion bond at a temperature less than the normal welding temperature of the material. The theory of such uniting is set forth in Sowter Patent No. 2,639,633 and Sowter Patent No. 2,639,634. Furthermore, the tool is useful for holding irregular shaped objects such as electrical terminals for joining such terminal to lead wire. The tool is quite universal for these and other uses because of the interchangeability of the removable jaws of the tool.

The illustrated embodiment of the invention sets forth a hand tool although power driven operation is entirely within the scope and intent of the invention. Handles 11 and 12 are pivotally joined by a pivot 13 and serve as a manual drive for two carriage jaws 16 and 17. The jaws 16 and 17 are referred to as carriage jaws because they are driven through a fixed path and carry exchangeable clamp jaws 30, 31, 32, and 33.

In the particular illustrated adaptation of the invention, the carriage jaws 16 and 17 are driven with a rectilinear movement by uniting the jaws 16 and 17 to the extreme ends of handles 11 and 12 by means of pivots 18 and 19. On the opposite side of handle pivot 13 the carriage jaws 16 and 17 are provided with slots 22 and 23 and receive pivots 20 and 21 carried by the handles 11 and 12. The particular location of the slots and pivots as illustrated provides rectilinear movement of carriage jaws 16 and 17 as handles 11 and 12 are opened and closed.

In order to assure the rectilinear movement in the particular adaptation, guide pins 25 and 26 bridge between the carriage jaws 16 and 17. The pins may be curved if a curved relative path is desired.

The clamp jaws 30 and 31 are removably secured to the carriage jaws 16 and 17 in a fixed location by means of screws 34 and 35 as ilustrated. The clamp jaws 32 and 33, on the other hand, are shiftably secured by screws 36 and 37 which pass through suitable slotted openings 38 and 39 through the carriage jaws 16 and 17.

The clamp jaws 32 and 33 are urged to an open position as illustrated in Figure 3 by means of springs 41 and 42 which are hooked into holes 43 and 44 but are driven into work clamping position with extreme force by means of cam levers 45 and 46. Reference to the drawing will reveal that the cams 45 and 46 are shaped to provide resultant forces which pass substantially through the pivots 18 and 19 and, consequently, act as over-center camming and locking devices. Those experienced in mechanical arts will readily understand the extreme pressures by which the jaws 32 and 33 may be forced toward the clamping jaws 30 and 31 to hold a workpiece and yet be locked in position by the cams. It will be observed from Figures 1 and 2 that the circular handle ends 45 and 46, when in locking positions, extend across the edges of the handles 11 and 12 directly in their paths of outward movement when the cam levers 45 and 46 lock the clamping jaws, so as to be automatically moved to release their engagement with the clamping jaws 32 and 33 to allow the springs 41 and 42 to automatically move the clamping jaws 32 and 33 to work releasing positions.

The construction as thus illustrated and described provides a utility tool having carriage jaws moveable toward and away from one another in a fixed path with drive means to move the carriage jaws in that path, and having a clamp couple carried by each carriage jaw with means mounting each said clamp jaw couple on the respective carriage jaw for relative opening and closing movement in a direction lateral to the carriage jaw path, and provides an over-center cam drive and lock means to close each clamp jaw coupled upon a workpiece.

Although the tool has general utility purposes, it is especially useful for driving two workpieces together with extreme force under confined conditions of flow in order to cause a solid phase bond between the workpiece at a temperature less than the normal welding temperature for the material.

Although the invention has been described in its preferred form with a certain degree of particularity, it is understood that the present disclosure of the preferred form has been made only by way of example and that numerous changes in the details of constuction and the combination and arrangement of parts may be resorted to without departing from the spirit and the scope of the invention as hereinafter claimed.

What is claimed is:

1. A plier-like hand tool having first and second closed and mutually pivoted levers with first and second parallel acting carriages actuated thereby, a first pivot interconnecting said first lever to said first carriage, a second pivot interconnecting said second lever to said second carriage, a swingable cam lever pivotally carried by said first pivot, said cam lever having a drive handle swingable to a closed and locked position against the side of said second lever in position to be struck and reversed by opening movement of said second lever, a work holding clamp device carried by said first lever and operated by said swingable cam lever, and a similar swingable cam lever and holding clamp associated in like manner with said second lever.

2. A pivoted lever tool for gripping and driving workpieces together along a rectilinear path, comprising, first and second pivoted levers each having a hand grip handle on one side of the pivot to receive drive force and each having a driven forward end on the opposite side of the pivot, a first carriage, first pivot means mounting said first carriage on the said forward end of said first lever, a sliding interconnection between said first carriage and said second lever handle, a second carriage, second pivot means mounting said second carriage on the said forward end of said second lever, a sliding interconnection between said second carriage and said first lever handle, said pivotal mounting of the first and second carriages on the first and second levers respectively and the sliding connection to the second and first levers respectively being proportioned and arranged in mutual relationship to produce a rectilinear relative movement of said first and second carriages, a first slidable jaw carried by said first carriage, a first drive cam lever pivotally mounted on said first pivot means, said first drive cam lever having a cam end surface engaged with said slidable jaw, a handle to drive said cam end surface, said handle having an arc of swing between an open position substantially in the plane of said rectilinear carriage movement and a closed position lying against the said second handle, said cam end surface and said slidable jaw being responsively related to cam the slidable jaw away from said first pivot means as said cam lever handle moves from the said open to said closed position thereof, and an anvil jaw carried by said first carriage opposed to said slidable and anvil jaw and a cam lever associated in like manner with said second pivot means, said cam end surface and said slidable jaw of both carriages having reaction forces arranged to create less force in a lever opening direction than required to move the levers and thereby said jaws remain locked until released, said first and second drive cam levers positioned against said handles to be contacted by the said associated handle upon opening movement of said handle to produce a workpiece release upon reversal of closing handle movement.

References Cited in the file of this patent
UNITED STATES PATENTS

| | | |
|---|---|---|
| 427,220 | Bernard | May 6, 1890 |
| 646,020 | Dewar | Mar. 27, 1900 |
| 1,998,509 | Keith | Apr. 23, 1935 |
| 2,217,077 | Phillips | Oct. 8, 1940 |
| 2,313,793 | Wood | Mar. 16, 1943 |
| 2,553,316 | Helminak | May 15, 1951 |
| 2,668,463 | Archer | Feb. 9, 1954 |
| 2,669,138 | Sowter | Feb. 16, 1954 |
| 2,715,345 | Rozmus | Aug. 16, 1955 |
| 2,774,262 | Sowter | Dec. 18, 1956 |

FOREIGN PATENTS

| | | |
|---|---|---|
| 689,927 | Great Britain | Apr. 8, 1953 |